W. W. VON TODENWARTH.
ACETYLENE CUTTING AND WELDING TORCH.
APPLICATION FILED SEPT. 24, 1915.
1,198,795.
Patented Sept. 19, 1916.
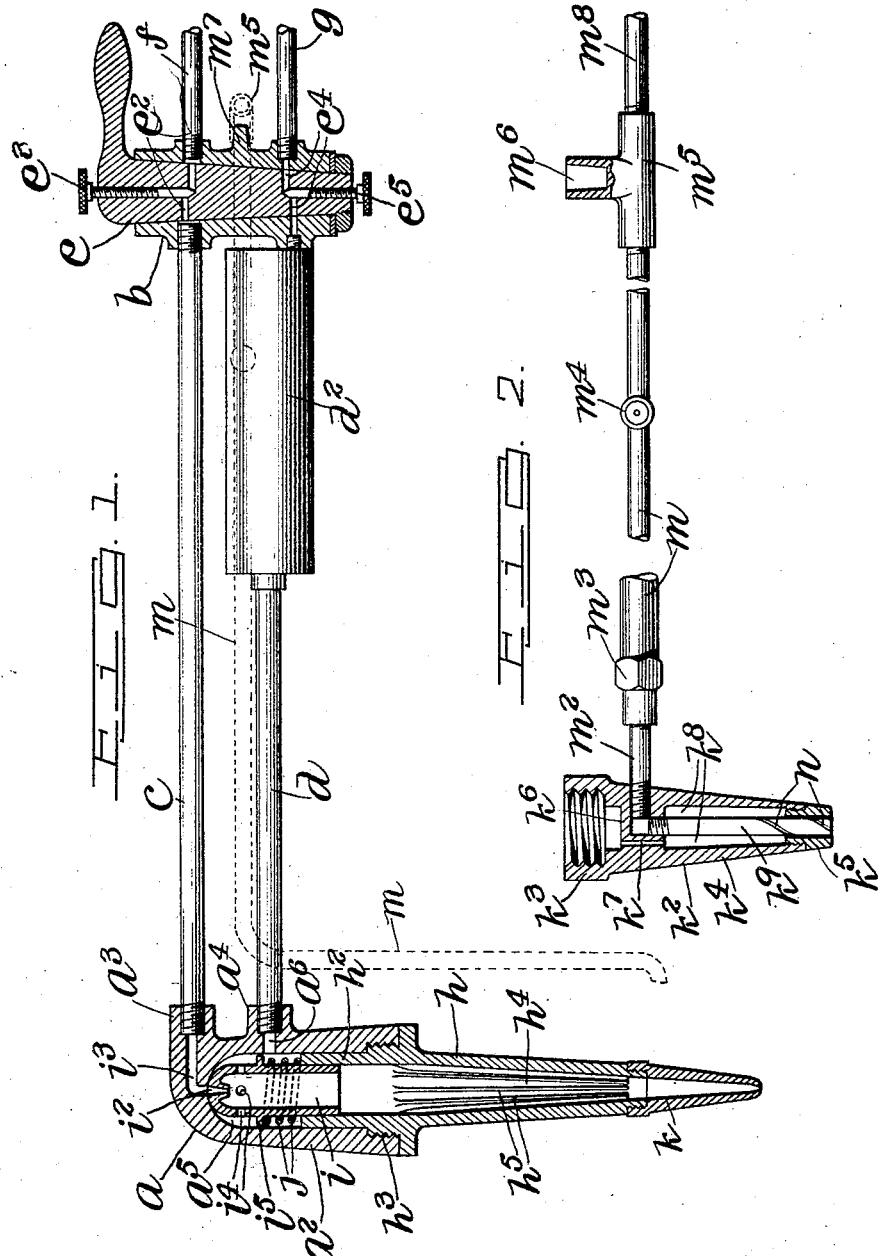
Witnesses:
H. E. Thompson
C. Mulreany
Inventor
Walter W. von Todenwarth
By his Attorneys
Edgar Tate & Co.

UNITED STATES PATENT OFFICE.

WALTER W. von TODENWARTH, OF RAHWAY, NEW JERSEY.

ACETYLENE CUTTING AND WELDING TORCH.

1,198,795.

Specification of Letters Patent.  Patented Sept. 19, 1916.

Application filed September 24, 1915. Serial No. 52,334.

*To all whom it may concern:*

Be it known that I, WALTER W. VON TODENWARTH, a citizen of the United States, and residing at Rahway, in the county of Union and State of New Jersey, have invented certain new and useful Improvements in Acetylene Cutting and Welding Torches, of which the following is a specification, such as will enable those skilled in the art to which it appertains to make and use the same.

This invention relates to acetylene gas torches, and particularly to devices of this class designed both for cutting and welding, and the object thereof is to provide an improved device of this class which is simple in construction and operation, convenient of manipulation, and which may be used wherever devices of this class are required.

The invention is fully disclosed in the following specification, of which the accompanying drawing forms a part, in which the separate parts of my improvement are designated by suitable reference characters in each of the views, and in which:—

Figure 1 is a sectional side view of my improved acetylene torch when used for welding purposes; and, Fig. 2 a sectional view of a modified form of attachment whereby the torch is made practical as a cutting torch.

In the practice of my invention, I provide a main torch head $a$ and a valve head $b$ connected by an oxygen pipe $c$ and an acetylene gas pipe $d$, and the acetylene gas pipe $d$ is provided with a flash back tank or flash back chamber $d^2$ which forms a part thereof and is of the usual form.

The oxygen pipe $c$ and the acetylene gas pipe $d$ with the flash back tank or chamber $d^2$ serve as a handle for the device, and the valve head $b$ is provided with a valve $e$ and with a main oxygen supply tube $f$ and an acetylene gas tube $g$ which are preferably both flexible and which may be connected with an oxygen supply and with an acetylene gas supply in the usual manner.

The pipe $c$ and tube $f$ are placed in communication by passages $e^2$ in the valve $e$ controlled by a needle valve $e^3$, and the tube $g$ and the flash back tank or chamber $d^2$ are placed in communication by passages $e^4$ in the valve $e$ controlled by a needle valve $e^5$, and the valve $e$ is the master or key valve of the device, while the supply of oxygen and acetylene gas is controlled by the needle valves $e^3$ and $e^5$, and by means of this construction the exact amount of oxygen and acetylene gas admitted to the burner or burner tip may be controlled at all times, and this valve device is a combination of the main master key valve $e$ and the needle valves $e^3$ and $e^5$.

The torch head $a$ is of the usual form and comprises a main outer casing $a^2$ provided at its upper end with an elbow extension $a^3$ with which the pipe $c$ is connected and adjacent thereto with a threaded sleeve $a^4$ with which the pipe $d$ is connected, and a tubular and tapered nozzle $h$ is also provided, and this nozzle is provided with an extension $h^2$ which fits in the head $a^2$ and with a threaded portion $h^3$ which screws into the head $a^2$, and the nozzle $h$ is provided with an interior tapered channel or passage $h^4$, the walls of which are provided with longitudinal ribs or fins $h^5$.

In the head $a^2$ is a chamber $a^5$ in which is placed a slidable sleeve $i$ which is closed at its upper end and open at its lower end, and the upper end of which is provided with an inwardly directed nozzle $i^2$, and the pipe $c$ communicates with a passage $i^3$ which communicates with the nozzle $i^2$, and the side walls of the sleeve $i$ are also provided with ports or passages $i^4$ which are placed a predetermined distance below the nozzle $i^2$, and the acetylene gas pipe $d$ communicates with the chamber $a^5$ through a passage $a^6$, and said sleeve $i$ is movable longitudinally in the chamber $a^5$ and is provided with a collar $i^5$ between which and the part $h^2$ is placed a spring $j$ which normally holds said sleeve in the position shown in Fig. 1, and said sleeve constitutes a sliding injector into which the oxygen and acetylene gas is admitted from the pipes $c$ and $d$, and said oxygen and acetylene gas are mingled in the sleeve $i$ and passed through the lower open end thereof into the discharge nozzle $h$, and the nozzle $h$ is provided with a burner tip $k$ designed for use in welding only, and by means of the tapered nozzle $i^2$ the oxygen is discharged into the sleeve $i$ in a spray fashion, and the acetylene being discharged into said sleeve below the nozzle $i^2$, a perfect mixture is obtained.

The object in making the sleeve or sliding injector $i$ movable, as shown and described is to accommodate the device to the expansion and contraction of the parts under heat or different degrees of heat, and the sleeve $i$ when made movable, in the manner herein shown and described, will not be destructively affected by the expansion and contraction of the part $a^5$ of the head $a$ under varying degrees of heat.

In Fig. 2, I have shown at $k^2$ a modified form of burner tip, intended for cutting purposes and, in practice, the burner tip $k^2$ is substituted for the burner tip $k$ shown in Fig. 1 and a tube $m$ is also employed and connected with the burner $k^2$ by means of a pipe $m^2$ having a coupling $m^3$. The tube $m$ is also provided with a valve $m^4$ and with a nozzle coupling $m^5$ having a socket $m^6$, and the head $b$ is provided with a stud $m^7$ adapted to enter the socket $m^6$, and the coupling $m^5$ is provided with a flexible tube $m^8$ which may be connected with an oxygen supply, and the object of this construction is to provide means whereby an additional supply of oxygen may be provided when a cutting nozzle is to be used, and in this operation the coupling $m^5$ is connected with the stud $m^7$ and the burner tip $k^2$ with the main nozzle $h$ of the head $a$, the burner tip $k$ having been detached.

The burner tip $k^2$ comprises a head $k^3$ having a tapered extension $k^4$ with which a tip $k^5$ is connected, and the head $k^3$ is adapted to be screwed onto the main nozzle $h$ of the head $a$ of the device, and the burner tip $k^2$ is provided with a transverse partition $k^6$ having a passage $k^7$ which communicates with a chamber $k^8$ with which the tip $k^5$ communicates and secured in the partition $k^6$ is a pipe $k^9$ with which the coupling pipe $m^2$ communicates, and the lower end of the pipe $k^9$ is spirally grooved as shown at $n$, and the oxygen and acetylene gas from the pipes $c$ and $d$ pass through the head $a$ and through the passage $k^7$ into the chamber $k^8$, and through the spiral groove $n$ to the burner tip, while the additional supply of oxygen furnished by the pipe $m$ passes through the pipe $k^9$, and the composition thus formed of oxygen and acetylene are discharged through the burner or cutting tip $k^5$, and the additional supply of oxygen through the pipe $k^9$.

By means of my improvement, I provide a device of the class described which may be used as a welder whenever desired and as a cutter whenever necessary, all that is necessary to change the device from a welder to a cutter being to detach the burner tip $k$ and apply the burner tip $k^2$ and connect the coupling $m^5$ with the stud $m^7$ as indicated in dotted lines in Fig. 1, the latter merely serving as means for supporting the pipe $m$, and my invention is not limited to this method of supporting said pipe, and changes in and modifications of the various details of construction herein shown and described may be made within the scope of the appended claims without departing from the spirit of my invention or sacrificing its advantages.

Having fully described my invention, what I claim as new and desire to secure by Letters Patent, is:—

1. In a device of the class described, a torch head, a spring controlled sleeve injector mounted in and movable longitudinally of the top portion of said torch head and having an inwardly directed nozzle in the top thereof, the bottom of said injector being open, said injector being also provided below the nozzle in the top thereof with ports or passages, and means for introducing oxygen through said nozzle and acetylene through said ports or passages into said injector whereby a mixture of said oxygen and acetylene is obtained in said injector, and said torch head being also provided with a detachable discharge nozzle having a detachable burner tip.

2. In a device of the class described, a torch head, a spring controlled sleeve injector mounted in and movable longitudinally of the top portion of said torch head and having an inwardly directed nozzle in the top thereof, the bottom of said injector being open, said injector being also provided below the nozzle in the top thereof with ports or passages, means for introducing oxygen through said nozzle and acetylene through said ports or passages into said injector whereby a mixture of said oxygen and acetylene is obtained in said injector, said torch head being also provided with a detachable discharge nozzle having a detachable burner tip, and means for introducing an additional supply of oxygen to the burner tip.

3. In a device of the class described, a torch head, oxygen and acetylene pipes connected with said head and provided with means for controlling the supply of oxygen and acetylene to said head, a movable spring-controlled sleeve injector mounted in said head and provided with ports or passages in the side and top thereof whereby said oxygen and acetylene pipes are placed in communication therewith and said torch head being provided with a detachable tapered discharge nozzle having internal fins or ribs.

4. In a device of the class described, a torch head, oxygen and acetylene pipes connected with said head and provided with means for controlling the supply of oxygen and acetylene to said head, said head being also provided with a tapered discharge nozzle having internal fins or ribs and said nozzle being provided with a detachable tapered burner tip.

In testimony that I claim the foregoing as my invention I have signed my name in presence of the subscribing witnesses this 22nd day of September, 1915.

WALTER W. von TODENWARTH.

Witnesses:
C. MULREAMY,
H. E. THOMPSON.